United States Patent [19]

Apuzzo

[11] Patent Number: 5,418,436

[45] Date of Patent: May 23, 1995

[54] MOTOR STARTING METHOD AND APPARATUS

[75] Inventor: Nickolas C. Apuzzo, Rochester, Minn.

[73] Assignee: International Business Machines Corporation, Armonk, N.Y.

[21] Appl. No.: 109,752

[22] Filed: Aug. 19, 1993

[51] Int. Cl.6 .................................. H02P 5/06
[52] U.S. Cl. .................. 318/497; 318/718; 318/799; 318/83
[58] Field of Search .............. 318/778, 83, 461, 799, 318/497; 388/808

[56] References Cited

U.S. PATENT DOCUMENTS

| 2,613,343 | 10/1952 | Ober | 318/497 |
| 3,683,247 | 8/1972 | Reimers | 318/461 |
| 4,724,366 | 2/1988 | Neesz | 318/461 |
| 5,289,097 | 2/1994 | Erickson et al. | 318/461 |

Primary Examiner—William M. Shoop, Jr.
Assistant Examiner—Karen Masih
Attorney, Agent, or Firm—Philip M. Kolehmainen

[57] ABSTRACT

A method for starting and operating an electric motor such as the spindle motor of a disk drive assembly employs a segmented stator winding. On startup, the winding segments are connected in series in order to maximize torque. Motor speed is detected, and when a predetermined speed is reached, the segments are connected in parallel to reduce the effective number of winding turns and maintain a control voltage for motor speed control. Switching of the winding segments can be by active elements such as FETs or by passive reactive elements responding directly to motor speed. For more gradual motor torque constant control, the winding may have more than two segments.

14 Claims, 3 Drawing Sheets

FIG. 8D
FIG. 8C
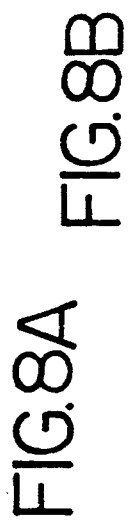
FIG. 8B
FIG. 8A
FIG. 6

MOTOR STARTING METHOD AND APPARATUS

BACKGROUND OF THE INVENTION

1. Field of the Invention

The present invention relates to improvements in methods for starting and operating electric motors such as hard disk drive motors, and to improved phase segmented stator winding assemblies with passive switching of phase segments.

2. Description of the Prior Art

In some applications where electric motors are used, the voltage and current as well as the power supply capacity available for motor operation are limited. One example of such an application is a spindle motor for a hard disk drive assembly of a portable computer having power supplied by batteries. In this type of environment, it is important to assure that power is employed efficiently in order to minimize battery drain, and to operate the motor without exceeding a designed maximum voltage and current.

Conflicting demands are placed on the motor during starting and during rotation at the designed operating speed. Before a disk drive assembly is started, the transducer heads typically rest on the surfaces of the disks. When the drive assembly is started, the motor must rotate the disks at an increasing speed until the speed of the disks relative to the heads causes the heads to fly on air bearings above the disk surfaces. A high start torque requirement results from friction between the heads and disk surfaces, and the starting torque problem is compounded by the large number of disks in present day drive assemblies. The high torque requirement presents difficulties, particularly in small form factor drives with small spindle motors.

It is not practical to simply increase the current available to the motor at start up because of the small maximum current available and because of power supply considerations. Another way to increase the starting torque supplied by a motor would be to increase the number of stator windings without increasing the motor drive current. But this approach causes problems at the motor operating speed. If the number of windings is increased, the motor torque constant is increased and the back EMF is larger. This results in decreased motor control voltage available during normal operation. Because the supply voltage is limited, it is desirable to limit back EMF at operating speed to maintain a control voltage differential sufficient for motor speed control.

In the past, segmented phase windings or polyphase windings have been used to permit switching of phase windings of electric motors for various purposes. U.S. Pat. Nos. 1,899,858 and 1,899,859 disclose alternating current motors with polyphase primary windings. Each primary winding includes a plurality of circuits normally connected in parallel with one another. In order to increase the impedance and reduce current when the motor is started, fewer than all the circuits are initially connected to the supply voltage. The remaining circuits are not energized until motor speed increases. Relays are used to control the connection of the winding circuits to the supply voltage.

U.S. Pat. No. 1,992,050 discloses a method and apparatus for starting alternating current motors in which the stator phases are divided into a plurality of independent portions. When the motor is started, all of the phase portions are connected in series. As motor speed increases, one or more phase portions is disconnected and remains idle while the other phase portions remain connected in series. When motor speed increases further, the phase portions are connected in parallel.

Arrangements such as disclosed in the above identified patents are not suitable for computer disk drives and similar applications. One serious defect in those arrangements is that they leave parts of the stator windings inactive under some conditions. Motor efficiency suffers when parts of the windings are not used, and as a result limited power supply capacity such as available in a battery powered system is not used efficiently. In addition it would be desirable to avoid the use of relays, such as employed in the arrangements of the above patents, and to avoid the use of other active switching elements.

SUMMARY OF THE INVENTION

A principal object of the invention is to provide a method of starting and operating an electric motor by varying the motor torque constant in response to motor speed while maximizing efficiency. Other objects are to provide a method including changing the connections of stator winding segments with active devices or, alternatively, with passive frequency responsive elements.

In brief, a method for starting and operating an electric motor in accordance with the present invention includes continuously energizing all of a plurality of segments of a stator winding. During starting of the motor, the segments are connected in series. When motor speed increases, the segments are connected in parallel.

BRIEF DESCRIPTION OF THE DRAWINGS

The present invention together with the above and other objects and advantages may be best understood from the following detailed description of the embodiments of the invention illustrated in the accompanying drawings, wherein:

FIG. 6 is a flow chart illustrating steps performed when starting and operating the motor in accordance with the present invention;

FIGS. 8A–8D are schematic illustrations of one phase of a stator winding comprising an alternative embodiment of the invention and showing the connections between winding segments at increasing motor speeds.

DETAILED DESCRIPTION OF THE PREFERRED EMBODIMENT

Figure 1:
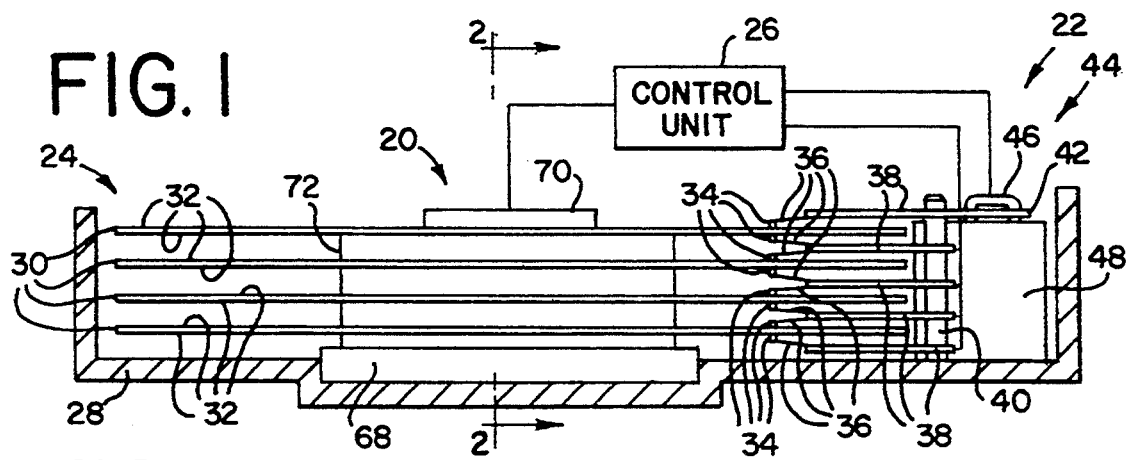
FIG. 1 is a simplified and partly schematic illustration of a hard disk drive assembly with which the present invention is employed.

The present invention provides improved methods for starting and operating electric motors such as the spindle motor assembly generally designated as 20 of the disk drive assembly generally designated as 22 in FIG. 1. While the invention provides important advantages when used with the spindle motor 20, it should be understood that principles of the invention are applicable to many different types of electric motors.

The disk drive assembly 22 seen in partly schematic and block diagram form in FIG. 1 includes a magnetic disk drive unit 24 and a drive control unit 26. The assembly 22 is illustrated in simplified form sufficient for an understanding of the present invention because the utility of the present invention is not limited to details of a specific drive assembly.

Disk drive assembly 22 includes a frame or housing 28 enclosing a stack of disks 30 having magnetic surfaces 32 where data may be written or read. Disks 30 are mounted in parallel, spaced apart relation for simultaneous rotation on the spindle motor 20. Data on each disk surface 32 are read and/or written by a corresponding magnetic transducer head 34 movable across the surface 32.

Transducer heads 34 are mounted on flexure springs 36 attached to arms 38 ganged together for simultaneous pivotal movement about a support spindle 40. One arm 38 includes an extension 42 driven in a pivotal motion by a head drive motor 44. Motor 44 is a coil-in-gap or voice coil motor including a coil 46 with a portion disposed in the magnetic flux gap of a permanent magnet and core assembly 48.

The drive control unit 26 is connected to the spindle motor 20, to the transducer heads 34 and to the motor 44 by suitable busses or lines. The drive control unit 26 controls the operation of the assembly 20 to rotate the disks 30 at a predetermined normal operating speed such as 3,600 RPM preferably using a feedback signal from a motor speed detector. The control unit 26 can use dedicated or embedded servo position control data on one or more disk surfaces 32 to control the head drive motor 44 in order to position the heads 34 over specific data tracks on the rotating surfaces 32. The control unit 26 can act as an interface between the drive assembly 22 and a central processing unit or other data utilizing device and can control the flow of data to the heads 34 for writing on the disk surfaces 32, and/or the flow of data read by the heads 34 from the surfaces 32.

Figure 2:
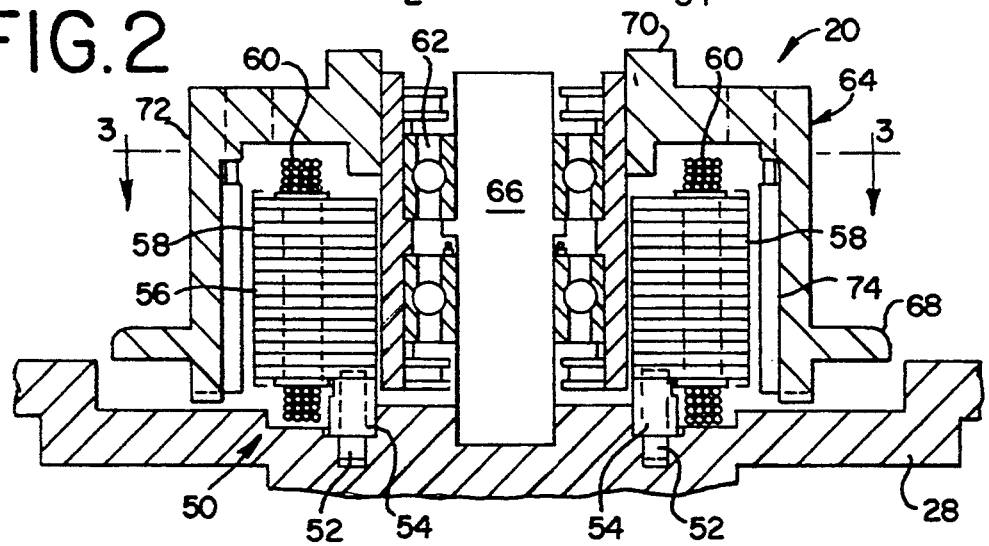
FIG. 2 is an enlarged sectional, fragmentary view of the spindle motor of the assembly, taken along the line 2—2 if FIG. 1.
Figure 3:
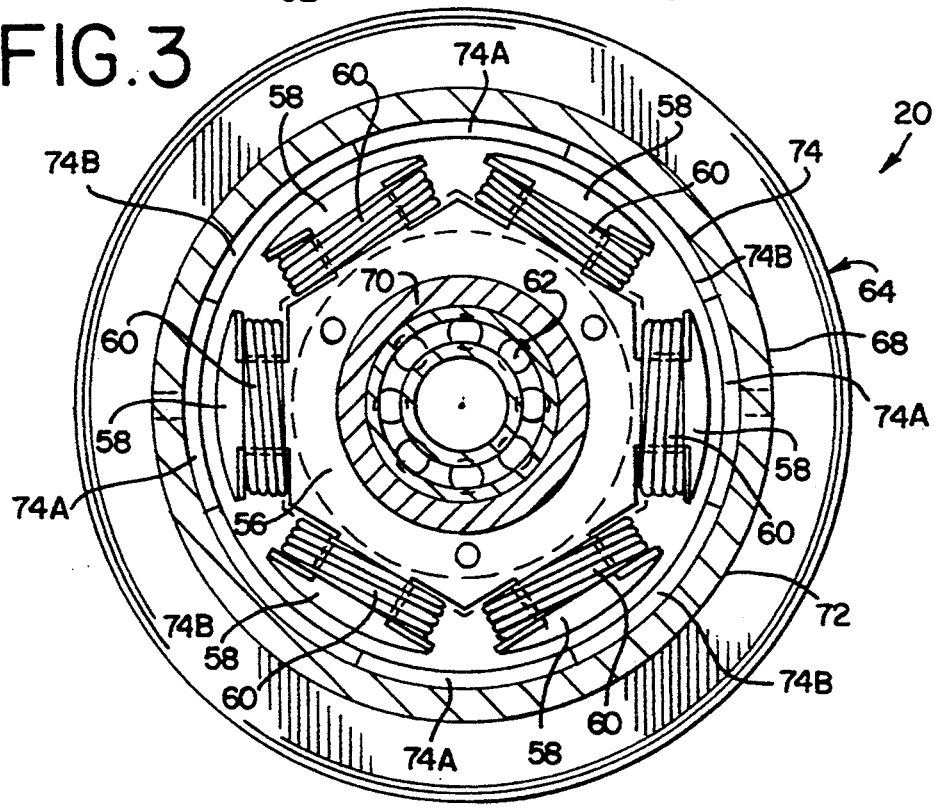
FIG. 3 is a sectional view of the motor taken along the line 3—3 of FIG. 2.

The spindle motor 20 is an integrated assembly of a rotating disk support spindle and electric motor and is best seen in FIGS. 2 and 3. A stator assembly 50 is mounted to the frame 28 by fasteners 52 and spacers 54. The stator includes a laminated core 56 having six poles 58 each supporting a stator winding or coil 60. A bearing assembly 62 supports a rotor assembly 64 for rotation around a central shaft 66 fixed to the frame 28. The rotor assembly 64 includes a spindle 68 having a central hub 70 attached to the bearing assembly 62 and a cylindrical outer wall 72 for supporting the stacked disks 30 seen in FIG. 1. Supported within the wall 72 is a permanent magnet assembly 74 including eight magnetic poles in a circular array surrounding the outer faces of the stator poles 58. The assembly 74 includes four south poles 74A alternating with four north poles 74B.

When the integrated spindle and motor assembly 20 is at rest, the heads 34 are held in engagement with the surfaces 32 of the disks 30 by the flexure springs 36. When the motor assembly is started, initially the heads 34 slide along the disk surfaces 32. When the speed of rotation increases sufficiently, the heads 34 lift from the disk surfaces and ride or fly upon an air bearing between the heads and disk surfaces. When the heads 34 are flying, friction is reduced. But when the heads 34 engage the disk surfaces 32 at lower speeds, there is substantial friction that must be overcome by the force applied by the motor 20. The need to overcome the frictional force resulting from head contact at motor start, added to other forces opposing motor rotation, causes difficulties in motor start up and operation.

More specifically, the torque delivered by the motor 20 varies with the strength of the magnetic forces with which the rotor poles 74A and 74B are repelled by the stator poles. The magnetic field generated by the stator windings 60 can be increased by increasing the supply voltage, the stator winding current or the number of turns of each stator winding. But there are problems with each of these approaches. It is undesirable to increase voltage or current in a battery powered device such as a portable computer or the like because this would increase battery drain and reduce operating time.

The number of turns in each stator winding 60 affects not only the motor torque but also the motor torque constant and back EMF. Back EMF increases as motor speed increases. At the predetermined operating speed of the motor 20, it is necessary that the back EMF be less than the applied voltage so that the difference can be used as a control voltage to regulate motor speed. Increasing the number of turns to increase motor starting torque has the undesirable effect of reducing the available control torque. Although it may be possible to use more stator winding turns for starting and then make some turns idle by switching or the like as speed increases, this would reduce motor efficiency. To maximize efficient use of the battery or other power supply, it is desirable that all of the winding turns be used continuously whenever the motor 20 is energized.

Figure 4:
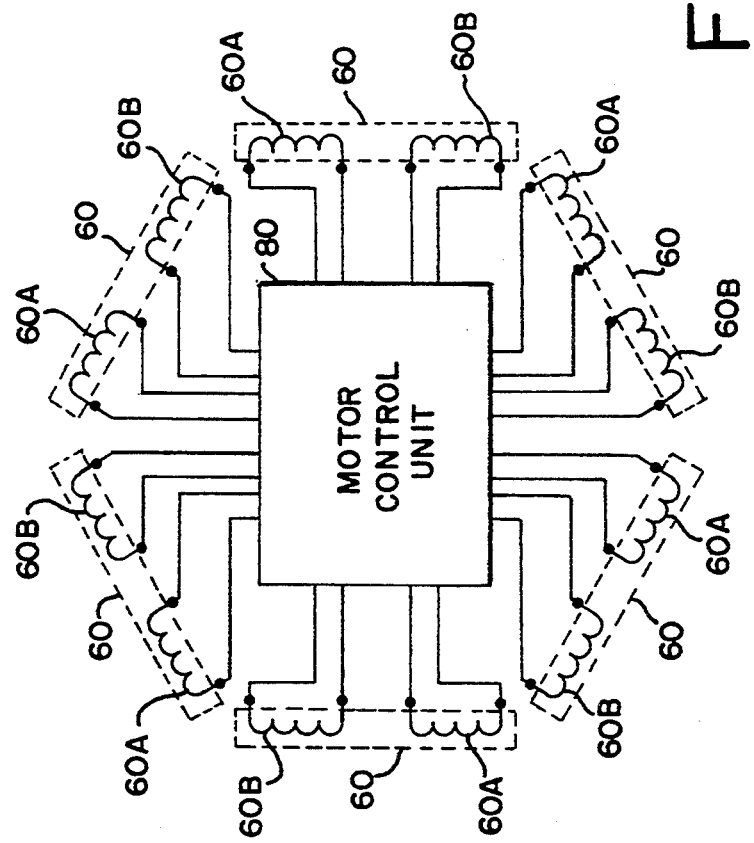
FIG. 4 is a schematic illustration of the stator winding and motor control unit of the motor.

In accordance with the present invention, motor starting torque is increased without sacrificing control torque at operating speed by segmenting the stator windings 60 and adjusting the motor torque constant in response to motor speed changes while maximizing efficiency. FIG. 4 is a schematic diagram of the stator windings 60 and a motor control unit 80 provided in accordance with the invention. Each of the six windings 60 is divided into two discrete and separately terminated segments 60A and 60B. The motor control unit 80 functions to connect each pair of winding segments 60A and 60B in series or in parallel with one another depending upon motor speed.

Figure 5:
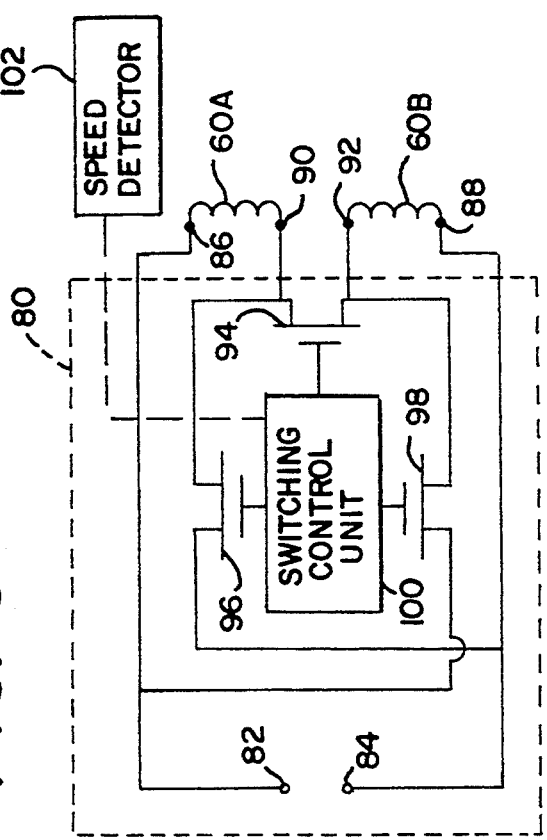
FIG. 5 is a schematic illustration of one phase of the stator winding and of associated components of the motor control unit.

FIG. 5 is a schematic and block diagram of one pair of segments 60A and 60B of a single winding 60, together with associated components of the motor control unit 80. Power supply terminals 82 and 84 are connected to winding terminals 86 and 88 of winding segments 60A and 60B. A suitable motor control system, typically part of the drive control unit 26 of FIG. 1, applies signals to the power supply terminals 82 and 84 with the appropriate reversing polarity frequency for start up or maintaining a constant operating speed. In a portable device such as a portable computer the power may be supplied one or more batteries.

Terminals 90 and 92 of winding segments 60A and 60B are interconnected by the output terminals of an FET 94. An FET 96 is connected between terminal 90 and power supply terminal 84, and an FET 98 is connected between terminal 92 and the power supply terminal 82. A switching control unit 100 is connected to the control terminals of the FETs 94, 96 and 98 and operates them between conductive and nonconductive states in response to motor speed detected by a motor speed detector 102. Detector 102 may be a Hall effect sensor, a back EMF measuring circuit or other detector providing a signal indicative of motor speed. Relays or other switching devices may be used instead of the FETs 94, 96 and 98 to control the interconnections of the winding segments 60A and 60B.

FIG. 6 is a flow chart of a routine carried out by the motor control unit 80 for starting and operating the motor 22. When motor 22 is started, the routine begins with block 104. Initially, as illustrated in block 106, the winding segments 60A and 60B are connected in series with one another. Referring to FIG. 5, this is done by operating FET 94 to a conductive state and operating FETs 96 and 98 to nonconductive states. Although only one winding 60 is seen in FIG. 5, all of the windings 60 of motor 22 are controlled simultaneously in the preferred embodiment of the invention, although other variations are possible.

In block 108, an indication of motor speed is obtained from the speed detector 102. A predetermined intermediate or crossover motor speed is established as part of the motor control method of the present invention. In block 110, the detected motor speed is compared with this crossover value. If the motor speed has not increased to the crossover value, the winding segments 60A and 60B are maintained in series circuit relation. Alternatively, when the motor speed increases to the crossover value, then as seen in block 112, the winding segments 60A and 60B are connected in parallel with one another. Referring to FIG. 5, this is done by operating FET 94 to a nonconductive state and operating FETs 96 and 98 to conductive states.

When the windings 60A and 60B are connected in series, the effective number of winding turns is at a maximum value. As a result the starting torque is maximized for a given available current and voltage. The increased torque is able to overcome friction of the heads 34 as they slide along the disk surfaces 32 and accelerate the motor quickly to a speed at which the heads fly and friction is reduced. After the crossover speed is reached and the winding segments 60A and 60B are switched to a parallel state, torque is decreased but due to reduced friction the reduction of torque is not a disadvantage. Because the winding segments 60A and 60B are in parallel, the effective or apparent number of turns is reduced and the available motor control voltage is maximized.

As the motor speed increases from zero at start, the motor torque decreases due to the effect of increasing back EMF. At some motor speed, the motor torque produced by the series connected winding segments is equal to the torque that the same winding segments can produce at maximum available supply voltage when the segments are connected in parallel. In order to maximize efficiency, this motor speed is preferably selected as the crossover speed for switching from series to parallel connection.

The routine of FIG. 6 ends with block 114 and the speed of the motor 20 is thereafter regulated in conventional manner by varying the stator winding control voltage applied to terminals 82 and 84 in response to speed detection signals to maintain a constant speed. However, for variable speed motor applications, a routine such as seen in FIG. 6 could be performed periodically or continuously to switch the windings between series and parallel states depending on detected speed variations.

One example of a variable speed motor application where the method of the present invention may be employed is the head drive motor 44 of FIG. 1. The coil 46 can be segmented in the manner seen in connection with one coil 60 in FIG. 5. When relatively large head movement is required and higher motor speeds are necessary, the winding segments are connected in parallel to maximize the voltage speed control. For smaller and more precise motor movements that are performed at slower speeds, the winding segments are connected in series.

In an exemplary specific embodiment of the invention, the motor is sized for a 2.5 inch form factor disk drive assembly. The supply voltage and current available at the motor terminals are 3 volts and 2 amps respectively. At the final operating speed of 3600 RPM the motor is capable of supplying 0.0018 newton-meters of torque. The motor torque constant is 0,008 newton-meters per amp, and the terminal resistance is 0,375 ohm. The motor has six stator poles and 8 rotor poles and a permanent magnet flux gap of 0.6 Tesla, thus having a resultant electrical drive to mechanical hub frequency ratio of 4:1. Each stator winding includes eighteen turns of a bifilar cable thus providing two separately terminated winding segments of eighteen turns each. Back EMF at operating speed is 2.88 volts, with a control voltage of 0.12 volt. At start up with the segments connected in parallel, the motor provides 0.030 newton-meters of torque. The crossover speed is 940 RPM. At this speed the torque provided by the series connected winding segments equals the torque provided by parallel connected segments using all of the available two amp supply current.

Figure 7:
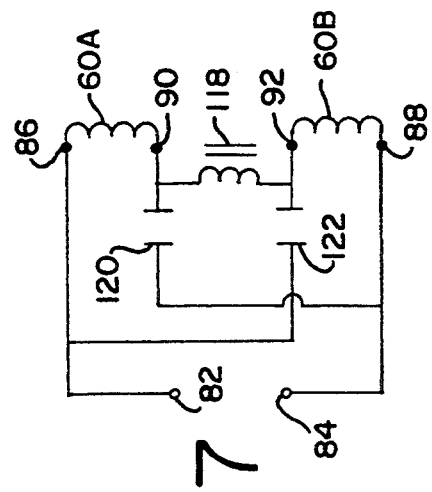
FIG. 7 is a schematic illustration of one phase of the stator winding illustrating an alternative embodiment of the invention.

In FIG. 7 an alternative switching arrangement is disclosed. Passive switching is achieved by using passive reactive circuit components in place of FETs or other externally controlled devices. An inductive choke 118 connects terminals 90 and 92, while capacitors 120 and 122 connect terminal 90 to supply terminal 84 and terminal 92 to supply terminal 82 respectively. At low motor speeds corresponding to low frequency winding excitation, the capacitors 120 and 122 act as high impedances while the choke acts as a low impedance connecting the winding segments 60A and 60B in series. As the excitation frequency and speed increase, the impedance of the choke 118 increases while the impedance of the capacitors 120 and 122 decreases. In a gradual manner as the motor speed increases, the motor current increasingly flows through the winding segments 60A and 60B in parallel rather than in series. At a sufficiently high speed, the series current becomes insignificant and the winding state is essentially parallel.

It is preferred that the winding segments 60A and 60B be provided by a coil wound with a bifilar conductor. This has the advantage that existing coil geometry can be retained and independent termination of the discrete winding segments is facilitated. In addition, the designed physical relationship of windings to poles is maintained whether the segments are connected in series or in parallel.

In accordance with the present invention, both of the winding segments 60A and 60B are continuously energized whenever the motor 20 is operated. As a result, all of the conductors in the winding are used continuously for the most efficient arrangement. When each stator phase winding is divided into two segments, the only winding configurations that are possible with the present invention are to connect the two segments in series or in parallel. This may limit gradations of control that may be desired in connection with some motors.

FIGS. 8A, 8B, 8C and 8D illustrate a phase winding arrangement having more than two segments. As seen in these figures a single phase winding 130 has eight discrete and separately terminated segments 130A through 130H. A motor can employ more than one such winding 130. Considered in sequence, these figures illustrate a progression of different interconnection states that can be used in accordance with the invention as motor speed increases. For simplicity, the switching devices, such as FETs, passive reactive devices or the like, have been omitted from these figures.

At motor start as seen in FIG. 8A, all the winding segments are connected in series with one another. This configuration provides the maximum available motor torque. As speed increases, the windings are switched in the manner described above to the configuration seen in FIG. 8B. Here four segments 130A–130D are connected in series and the remaining four segments 130E–130H are connected in series. These series connected groups are connected in parallel with one another.

The next configuration as speed increases further is seen in FIG. 8C. In four pairs of winding segments 130A–130B, 130C–130D, 130E–130F and 130G–130H the segments are connected in series with one another, while the series connected pairs are all connected in parallel. In the highest speed configuration of FIG. 8D, all of the winding segments 130A–130H are in parallel with one another.

The arrangement of FIGS. 8A–8D has the advantage that the segment array can be switched in small graduations between entirely series to entirely parallel configurations. The ability to control the torque constant in smaller increments can be advantageous in some applications such as zone bit data recording systems or the like. More or fewer segments could be employed. Using printed circuit winding techniques, every individual turn of a winding could be switched as a discrete independently terminated segment, providing the capability for nearly continuously programmable torque constant control.

I claim:

1. A method for starting and operating an electric motor having a stator phase winding including a plurality of discrete and separately terminated phase winding segments, said method comprising the steps of:
   (a) continuously energizing all of said phase winding segments throughout starting and operating of the motor;
   (b) connecting said phase winding segments in series circuit relation with one another during starting of the motor; and
   (c) connecting said phase winding segments in parallel circuit relation with one another in response to an increase of motor speed to a predetermined speed.

2. A method as claimed in claim 1 further comprising:
   (d) detecting the speed of movement of said motor, and
   (e) selecting either connecting step (b) or connecting step (c) depending upon the detected motor speed.

3. A method as claimed in claim 2 wherein said selecting step (e) includes comparing the detected speed with a predetermined crossover speed, and selecting connecting step (b) only when the detected speed is less than the predetermined crossover speed.

4. A method as claimed in claim 1 wherein the stator phase winding has at least three phase winding segments, further comprising an intermediate step between connecting steps (b) and (c), said intermediate step including connecting at least two phase winding segments in series with one another and connecting at least one phase winding segment in parallel with the series connected phase winding segments.

5. A disk drive assembly comprising in combination:
   a housing;
   a stack of rotatable disks with surfaces where data is written or read;
   a plurality of transducer heads slidable on said surfaces at slow disk rotation speeds and flying over said surfaces at high disk rotation speeds; and
   a spindle motor for supporting and rotating said disks;
   said disk drive assembly being characterized by:
   said spindle motor having at least one stator phase winding including first and second discrete and independently terminated phase winding segments;
   control means including means for connecting said segments in series at low speeds; and
   said control means further including means for directly changing the connection of said segments from series to parallel at a higher motor speed.

6. The disk drive assembly of claim 5 further comprising means for detecting motor speed, said control means operating in response to detected motor speed.

7. The disk drive assembly of claim 6, said control means including FETs for changing the connections of said segments.

8. The disk drive assembly of claim 5, said control means including frequency responsive reactive elements for changing the connections of said segments.

9. A system for varying the torque constant of an electric motor comprising:
   a stator phase winding having at least two distinct and independently terminated phase winding segments;
   stator winding power supply terminals;
   control means for continuously energizing all of said segments by connecting said segments to said power supply terminals;
   said control means including first switch means for connecting said segments in series between said terminals; and
   said control means including second switch means for connecting said segments in parallel between said terminals.

10. A system as claimed in claim 9, said stator phase winding being formed of a bifilar conductor, each said phase winding segment comprising one filament of said bifilar conductor.

11. A system as claimed in claim 9, said first and second switch means comprising active switching devices, said system further comprising motor speed detecting means, and said control means including means for operating said first and second switch means in response to said motor speed detecting means.

12. A system as claimed in claim 9, said first and second switching means comprising passive frequency responsive reactive elements.

13. A system as claimed in claim 11, said first and second switch means comprising FETs.

14. A system as claimed in claim 12, said reactive elements including a choke connected between said widning segments and capacitors connecting said winding segments to said power supply terminals.

* * * * *